US010523821B2

(12) United States Patent
Zhou et al.

(10) Patent No.: US 10,523,821 B2
(45) Date of Patent: Dec. 31, 2019

(54) SYNCHRONIZED GROUP MESSAGING

(71) Applicant: QUALCOMM Incorporated, San Diego, CA (US)

(72) Inventors: Yan Zhou, San Diego, CA (US); Simone Merlin, San Diego, CA (US); George Cherian, San Diego, CA (US); Santosh Paul Abraham, San Diego, CA (US); Gwendolyn Denise Barriac, Encinitas, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/038,023

(22) Filed: Jul. 17, 2018

(65) Prior Publication Data
US 2018/0324306 A1 Nov. 8, 2018

Related U.S. Application Data

(63) Continuation of application No. 14/269,960, filed on May 5, 2014, now abandoned.

(60) Provisional application No. 61/898,924, filed on Nov. 1, 2013.

(51) Int. Cl.
*H04M 3/56* (2006.01)
*H04L 12/18* (2006.01)
*H04L 5/00* (2006.01)

(52) U.S. Cl.
CPC .......... *H04M 3/567* (2013.01); *H04L 12/189* (2013.01); *H04L 5/0055* (2013.01); *H04M 2203/205* (2013.01); *H04M 2203/356* (2013.01)

(58) Field of Classification Search
USPC ...................................................... 370/311
See application file for complete search history.

(56) References Cited

U.S. PATENT DOCUMENTS

| 5,559,804 | A  | * | 9/1996 | Amada ............. | H04W 72/0406 370/311 |
| 6,240,083 | B1 | * | 5/2001 | Wright .................. | H04W 74/02 370/348 |
| 7,319,684 | B2 |   | 1/2008 | Tamaki et al. | |
| 7,356,010 | B2 | * | 4/2008 | He ..................... | H04W 72/1289 370/338 |
| 8,671,451 | B1 |   | 3/2014 | Lambert | |
| 2002/0025810 | A1 | * | 2/2002 | Takayama ............. | H04W 48/20 455/432.1 |
| 2002/0177460 | A1 | * | 11/2002 | Beasley ................ | H04B 7/2662 455/502 |

(Continued)

*Primary Examiner* — Jamaal Henson
(74) *Attorney, Agent, or Firm* — Paradice and Li LLP; Kevin M. Donnelly

(57) ABSTRACT

Devices and methods for synchronized group messaging in a wireless communication system are described. Multicast transmissions, such as those in a dense network, can cause significant medium usage because same multicast packet is likely sent by multiple APs at different time. Medium usage in such implementations may be redundant. As such, the transmission medium is not used optimally. Devices and methods which coordinate and align group messages (e.g., multicast packets) amongst APs are described. Each AP may be configured to transmit identical packets at the same time. Therefore, medium usage can be reduced, while the range can be extended due to accumulated energy from APs.

19 Claims, 11 Drawing Sheets

(56) References Cited

U.S. PATENT DOCUMENTS

| | | | |
|---|---|---|---|
| 2003/0064752 A1* | 4/2003 | Adachi | H04L 63/08, 455/560 |
| 2003/0137993 A1 | 7/2003 | Odman | |
| 2004/0171402 A1* | 9/2004 | Tamaki | H04W 74/02, 455/522 |
| 2005/0073964 A1 | 4/2005 | Schmidt et al. | |
| 2005/0086481 A1* | 4/2005 | Winget | H04L 63/062, 713/176 |
| 2007/0086532 A1 | 4/2007 | Ferchland et al. | |
| 2007/0135150 A1* | 6/2007 | Ushiki | H04W 12/0602, 455/509 |
| 2007/0253382 A1* | 11/2007 | Ghassemzadeh | H04L 7/0008, 370/338 |
| 2008/0037460 A1 | 2/2008 | Venkatachalam | |
| 2008/0037472 A1 | 2/2008 | Ryu et al. | |
| 2008/0056219 A1* | 3/2008 | Venkatachalam | H04W 72/005, 370/342 |
| 2008/0095134 A1* | 4/2008 | Chen | H04B 7/2606, 370/342 |
| 2008/0175237 A1* | 7/2008 | Kim | H04L 12/1886, 370/389 |
| 2009/0175260 A1* | 7/2009 | Wang | H04W 56/001, 370/350 |
| 2009/0190518 A1* | 7/2009 | Kim | H04L 12/189, 370/312 |
| 2009/0207773 A1* | 8/2009 | Feng | H04L 41/5022, 370/312 |
| 2009/0245517 A1 | 10/2009 | Tinnakornsrisuphap et al. | |
| 2011/0019605 A1 | 1/2011 | Ma et al. | |
| 2011/0032849 A1* | 2/2011 | Yeung | H04B 7/0434, 370/280 |
| 2011/0310784 A1 | 12/2011 | Park | |
| 2012/0201195 A1 | 8/2012 | Rausch et al. | |
| 2013/0089123 A1* | 4/2013 | Rahul | H04L 27/2691, 375/219 |
| 2013/0176897 A1* | 7/2013 | Wang | H04W 12/06, 370/254 |
| 2013/0176932 A1 | 7/2013 | Shousterman et al. | |
| 2013/0201835 A1* | 8/2013 | Banerjea | H04W 74/0816, 370/241 |
| 2013/0208708 A1 | 8/2013 | Nezou et al. | |
| 2013/0229996 A1* | 9/2013 | Wang | H04W 72/0413, 370/329 |
| 2013/0250844 A1 | 9/2013 | Lee et al. | |
| 2013/0265991 A1 | 10/2013 | Dinan | |
| 2013/0336295 A1 | 12/2013 | Dinan | |
| 2013/0339438 A1 | 12/2013 | Cherian et al. | |
| 2014/0031063 A1 | 1/2014 | Park et al. | |
| 2014/0056205 A1 | 2/2014 | Aboul-Magd et al. | |
| 2014/0301383 A1 | 10/2014 | Sohn et al. | |
| 2015/0124681 A1 | 5/2015 | Zhou et al. | |

* cited by examiner

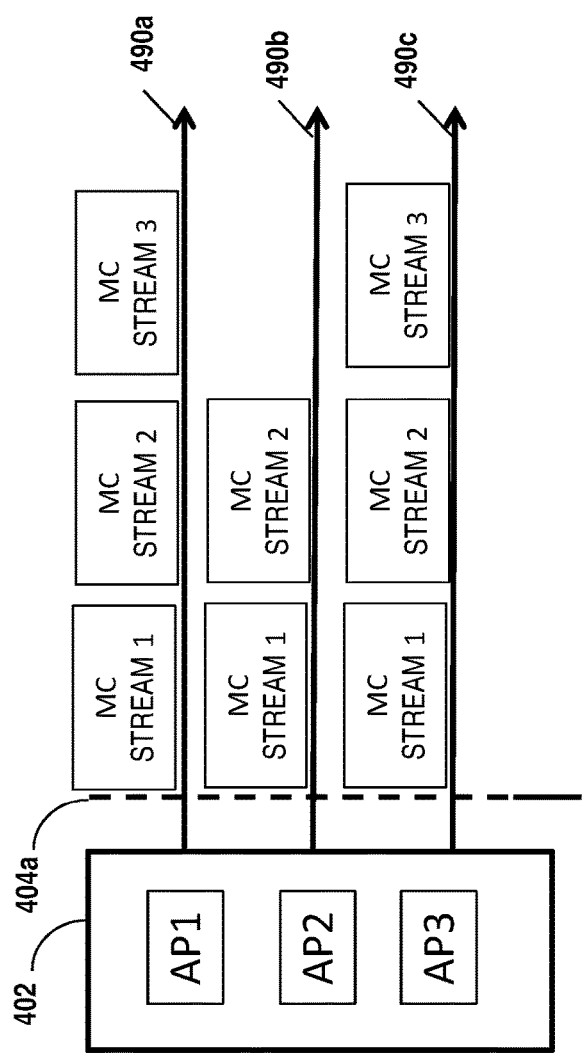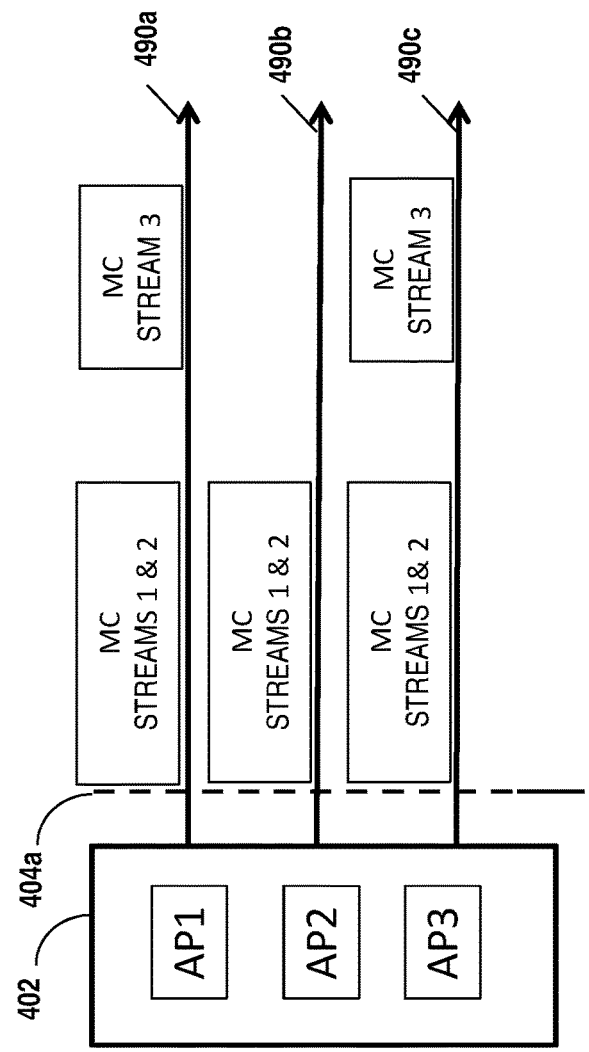

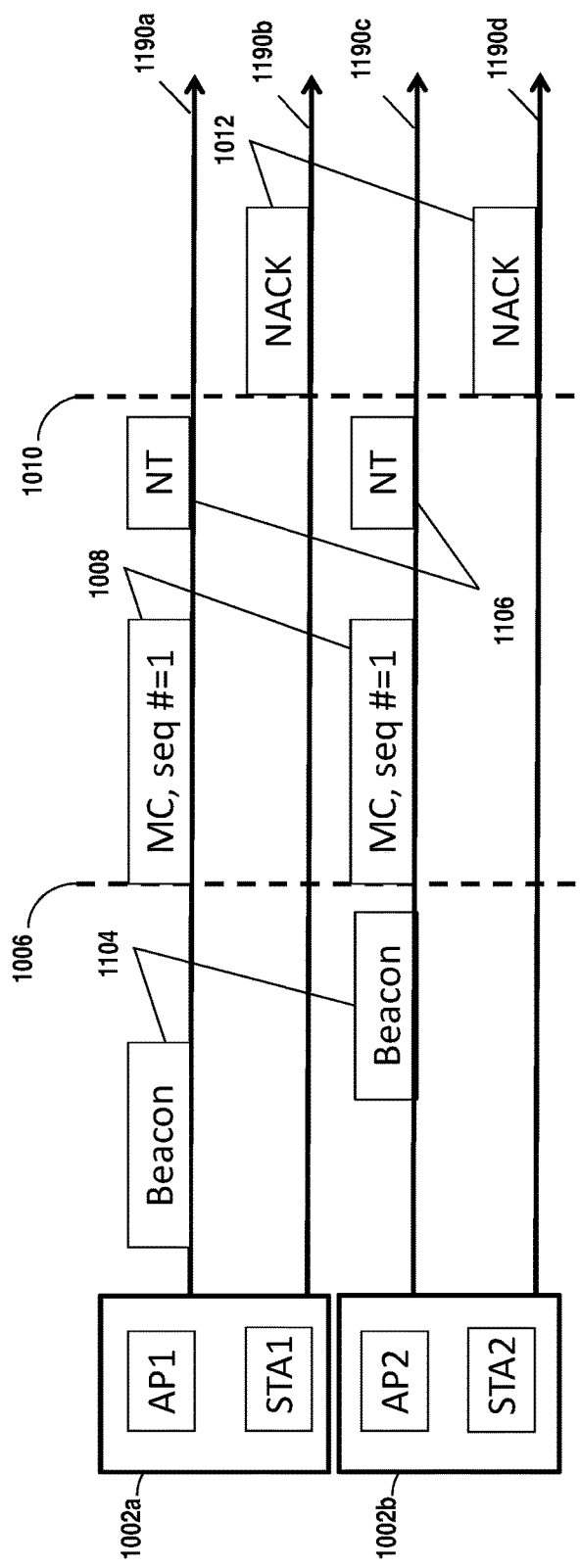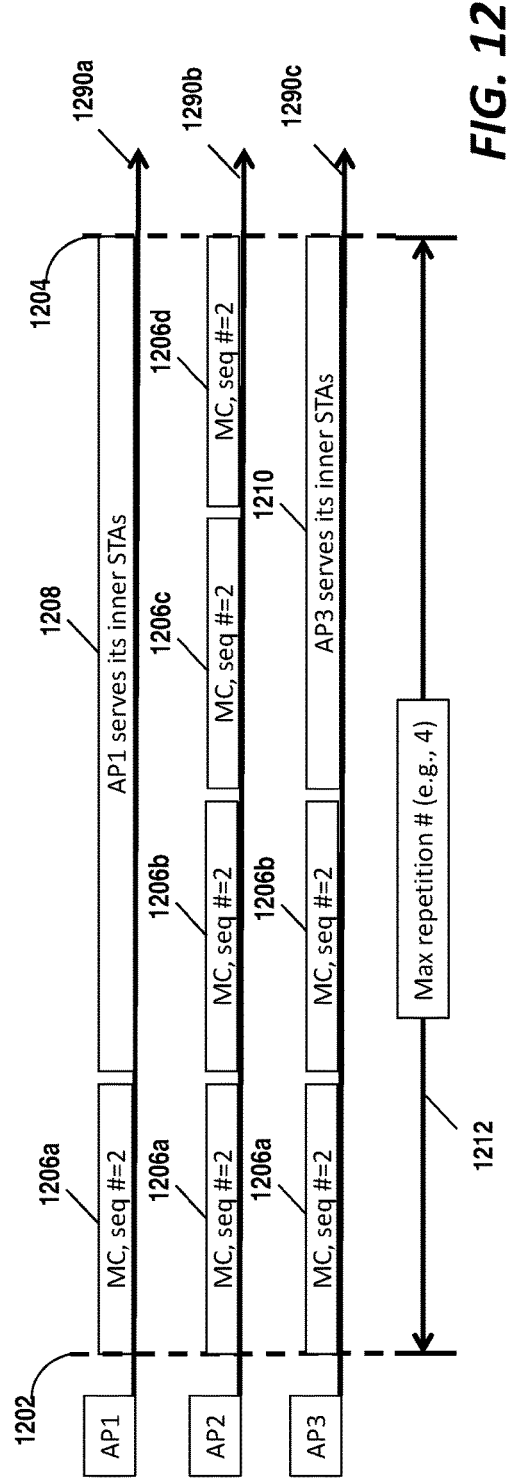

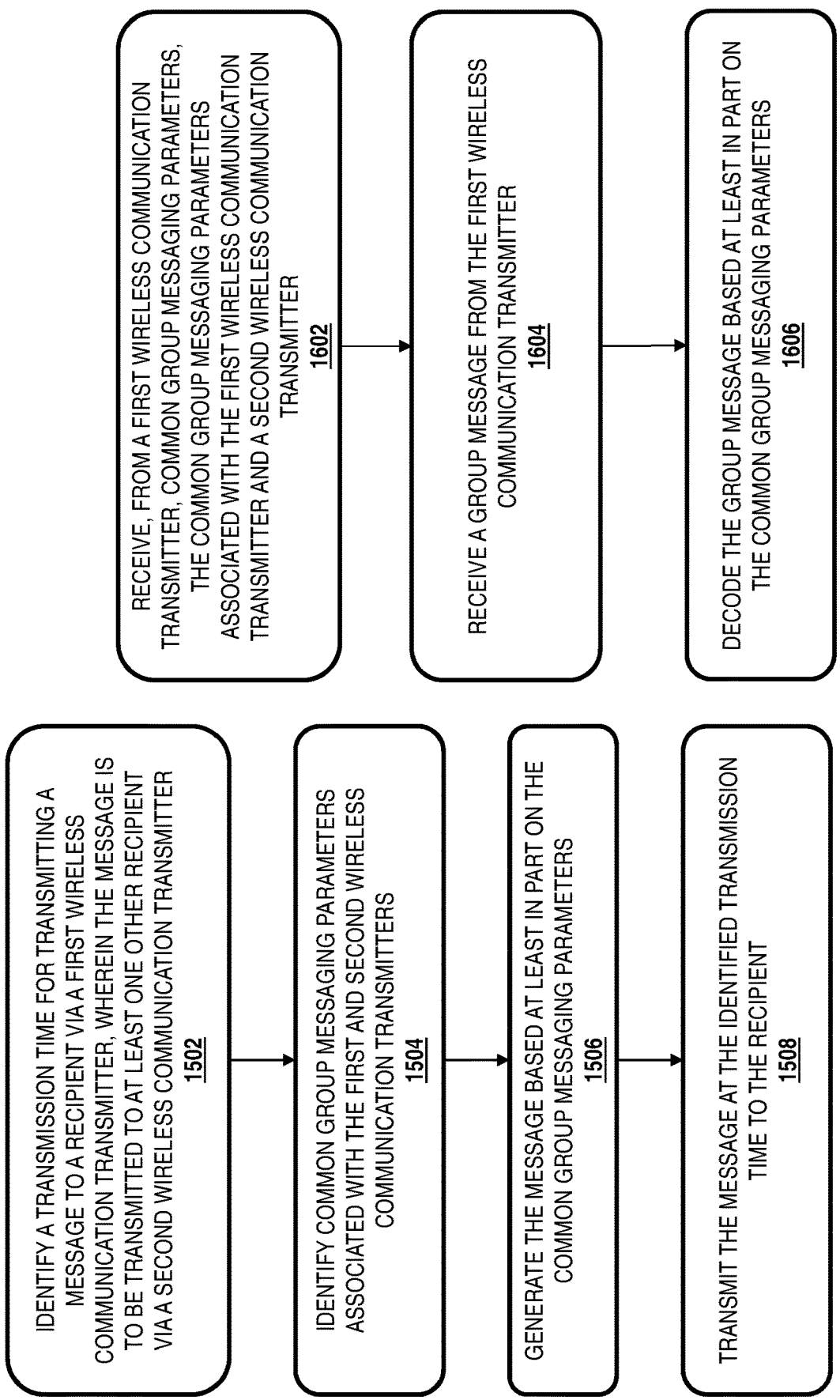

SYNCHRONIZED GROUP MESSAGING

CROSS-REFERENCE TO RELATED APPLICATIONS

This application is a continuation of, and claims priority to, U.S. patent application Ser. No. 14/269,960 filed 5 May 2014 and titled "Synchronized Group Messaging," which claims the benefit of priority from U.S. Provisional Patent Application Ser. No. 61/898,924 filed 1 Nov. 2013 and titled "Synchronized Group Messaging," both of which disclosures are hereby incorporated by reference herein in their entireties.

BACKGROUND

Field

The present application relates generally to wireless communications, and more specifically to devices and methods for synchronized group messaging in a wireless communication system.

Background

In many telecommunication systems, communications networks are used to exchange messages among several interacting spatially-separated devices. Networks may be classified according to geographic scope, which may be, for example, a metropolitan area, a local area, or a personal area. Such networks may be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks may be configured for a variety of communication patterns. One communication pattern is unicasting whereby a message is transmitted from one entity to another entity. Group messaging may be used to transmit message from an entity to a group of recipients. Common broadcast and multicast are two examples of group messaging. During group messaging, multiple transmitters may be included to ensure transmission to each group recipient.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include, among other things, extended range and conservation of medium usage.

In one innovative aspect, a method of wireless communication is provided. The method includes identifying a transmission time for transmitting a message to a recipient via a first wireless communication transmitter, wherein contents of the message is to be transmitted to at least one other recipient via a second wireless communication transmitter. The method also includes identifying common group messaging parameters associated with the first wireless communication transmitter and the second wireless communication transmitter. The common group messaging parameters include a group temporal key, a common transmission media access control address, and a common group identifier. The method further includes generating the message. The message is generated based at least in part on the common group messaging parameters. The contents of the message to be transmitted to the recipient is the same as contents of the message transmitted to the at least one other recipient. The method also includes transmitting the message at the identified transmission time to the recipient.

In yet another innovative aspect, a wireless communication device is provided. The device includes a timing processor configured to identify a transmission time for transmitting a message to a recipient, wherein contents of the message is to be transmitted to at least one other recipient via a second wireless communication device. The device also includes a zone identity manager configured to obtain a zone identifier for the wireless communication device. The zone identifier is also associated with the second wireless communication device. The zone identifier is indicative of common group messaging parameters. The common group messaging parameters include a group temporal key, a common transmission media access control address, and a common group identifier. The device includes a packet processor configured to generate the message based at least in part on the common group messaging parameters. Contents of the message to be transmitted to the recipient is the same as contents of the message to be transmitted to the at least one other recipient. The device further includes a transmitter configured to transmit the message at the identified transmission time to the recipient.

Another method of wireless communication is provided in a further innovative aspect. The method includes receiving, from a first wireless communication transmitter, common group messaging parameters, the common group messaging parameters associated with the first wireless communication transmitter and a second wireless communication transmitter. The common group messaging parameters include at least one of a group temporal key, common group identifier, or common transmission media access control address. The method further includes receiving a group message from the first wireless communication transmitter. The method also includes decoding the group message based at least in part on the common group messaging parameters.

A further wireless communication device is provided in another innovative aspect. The device includes a zone parameter manager configured receive common group messaging parameters, the common group messaging parameters associated with the first wireless communication transmitter and a second wireless communication transmitter. The device includes a receiver configured to receive a group message. The device also includes a packet processor configured to decode the group message the group message based at least in part on the common group messaging parameters In a further innovative aspect, a non-transitory computer readable medium is provided. The non-transitory computer readable medium includes instructions executable by a processor of a wireless communication device. The instructions, when executed, cause the wireless communication apparatus

BRIEF DESCRIPTION OF THE DRAWINGS

FIG. 5A shows a message timeline diagram for an exemplary multicast messaging system in which aggregation may occur.

FIG. 5B shows a message timeline diagram for an exemplary multicast messaging system in which aggregation has occurred.

FIG. 11 shows a message timeline diagram for another exemplary multicast messaging system including coordinated NACK messaging.

FIG. 12 shows a message timeline diagram for an exemplary multicast messaging system including repetition rate adaptation.

FIG. 15 shows a process flow diagram of a method of wireless communication.

FIG. 16 shows a process flow diagram of another method of wireless communication.

DETAILED DESCRIPTION

Figure 1:
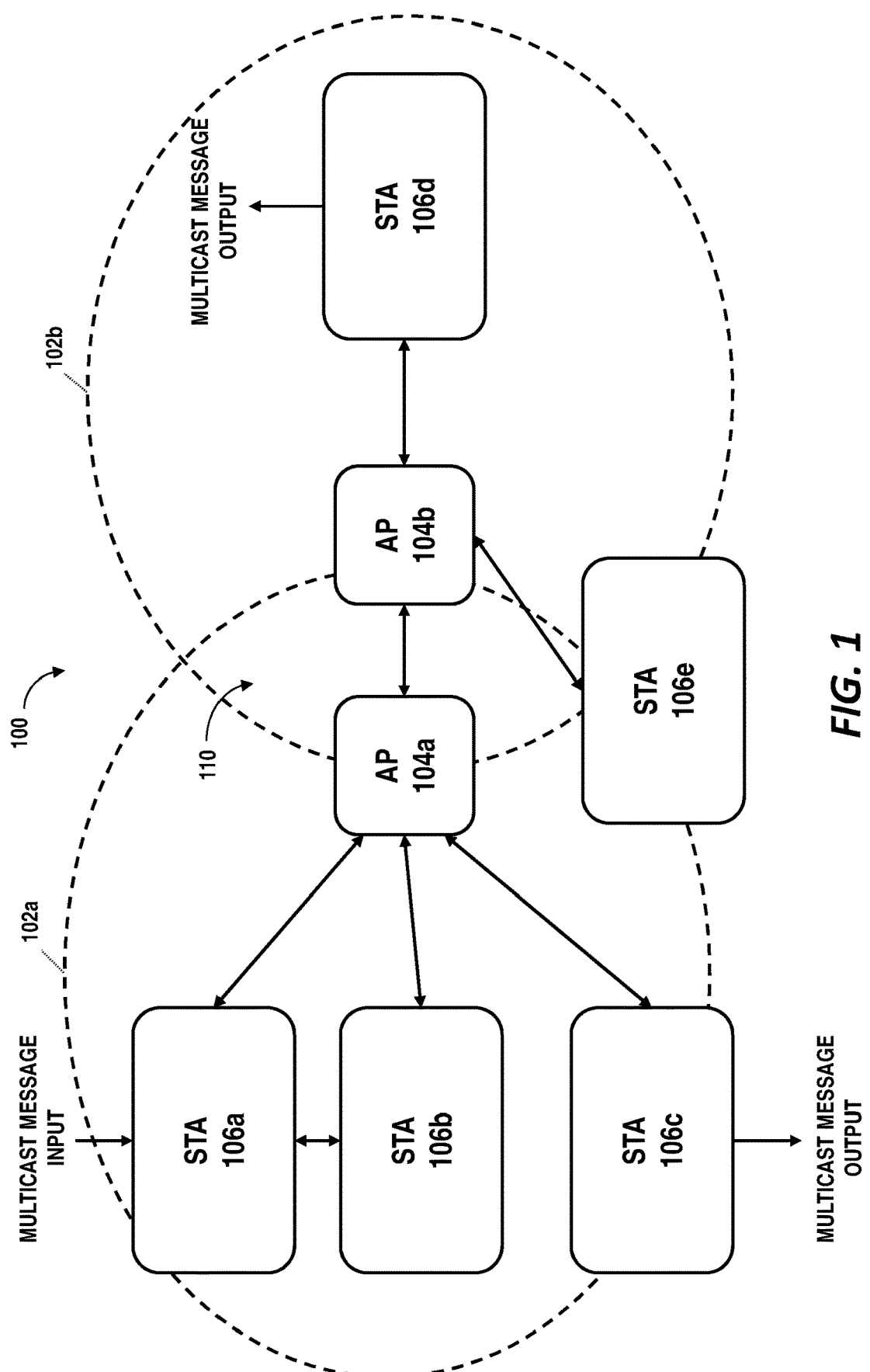
FIG. 1 illustrates an example of a wireless communication system in which aspects of the present disclosure may be employed.

Multicast transmissions, such as those in a dense network, can cause significant medium usage because multicast packets are likely sent by multiple AP in the network. Packets in such implementations may include redundant content. As such, the transmission medium is not used optimally because the medium may be reserved multiple times for transmission of the same information. As is described in further detail, alignment the transmissions of multicast packets across APs. Each AP may be configured to transmit identical packets at the same time.

To achieve the aligned transmission, the APs included in the group messaging may be configured to coordinate a common transmit time for the group messages. This may be achieved through a priori scheduling. In such implementations, each AP may transmit one or more protection frames before the scheduled time to clear the medium for group messages. Another way to coordinate the common transmit time is through triggering. In such implementations, the common transmit time is triggered by one of the APs. Where the APs are within range, this may be achieved through transmission of a special coordination frame from an AP designated as the master to the other group messaging APs. Where the APs are not within range, the coordination signal may be transmitted via backhaul signaling.

In another aspect, to ensure coordinated group messaging, each AP may be configured to send the same packets at the same time. For example, a multicast message may be transmitted over a sequence of packets. Each AP included in a multicast of this message should transit the packets in the same sequence. In addition to aligning the sequence numbers across APs, a stream ID, and payload of the packets transmitted at the same time must be same. For example, header information, including a basic service set identifier (BSSID) and other fields, as well as any encryption information (e.g., key) included in the packet may be coordinated.

Furthermore, to ensure coordinated group messaging, each AP may configured to use same transmit parameters so that packets can be seamlessly combined. For example, the physical layer frame format, the modulation coding scheme, rate, etc. may be coordinated amongst the group messaging APs.

Further details of the coordination are provided in detailed description which follows. The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art may appreciate that the scope of the disclosure is intended to cover any aspect of the novel systems, apparatuses, and methods disclosed herein, whether implemented independently of, or combined with, any other aspect described. For example, an apparatus may be implemented or a method may be practiced using any number of the aspects set forth herein. In addition, the scope of the described features is intended to cover such an apparatus or method which is practiced using other structure, functionality, or structure and functionality in addition to or other than the various aspects of the invention set forth herein. It may be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not limited to particular benefits, uses, or objectives. Rather, aspects of the disclosure are broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. However, the various aspects described herein may apply to any communication standard, such as a wireless protocol.

In some implementations, a WLAN includes various devices which are the components that access the wireless network. For example, there may be two types of devices: access points ("APs") and clients (also referred to as stations or "STAs"). In general, an AP may serve as a hub or base station for the WLAN, and a STA serves as a user of the WLAN. For example, a STA may be a laptop computer, a personal digital assistant (PDA), a mobile phone, etc. As an example, a STA may connect to an AP via a WiFi (e.g., IEEE 802.11 protocol) compliant wireless link to obtain general connectivity to the Internet or to other wide area networks. In some implementations, a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, a STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure may be employed. The wireless communication system 100 may operate pursuant to a wireless standard, such as an 802.11 standard. The wireless communication system 100 may include an AP 104a, which communicates with STAs (e.g., 106a, 106b, and 106c). In some aspects, the wireless communication system 100 may include more than one AP. As shown in FIG. 1, a second AP 104b is included.

The STAs may communicate with other STAs. As an example, the STA 106a may communicate with the STA 106b. As another example, the STA 106a may communicate with the STA 106c; although, this communication link is not illustrated in FIG. 1.

A variety of processes and methods may be used for transmissions in the wireless communication system 100 between the AP 104a and the AP 104b and the STAs as well as between an individual STA, such as the STA 106a, and another individual STA, such as the STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104a and the STAs and between an individual STA, such as the STA 106a, and another individual STA, such as the STA 106b, in accordance with CDMA techniques. If this is the case, the wireless communication system 100 may be referred to as a CDMA system.

A communication link that facilitates transmission from the AP 104a or the AP 104b to one or more of the STAs may be referred to as a downlink (DL), and a communication link that facilitates transmission from one or more of the STAs to the AP 104a or the AP 104b may be referred to as an uplink (UL). Alternatively, the downlink may be referred to as a forward link or a forward channel, and the uplink may be referred to as a reverse link or a reverse channel.

A communication link may be established between STAs. Some possible communication links between STAs are illustrated in FIG. 1. As an example, a communication link may facilitate transmission from the STA 106a to the STA 106b. Another communication link may facilitate transmission from the STA 106b to the STA 106a.

The AP 104a may act as a base station and provide wireless communication coverage in a basic service area (BSA) 102a. The AP 104a along with the STAs associated with the AP 104a and that use the AP 104a for communication may be referred to as a basic service set (BSS). Similarly, the AP 104b may provide a BSA 102b. As shown in FIG. 1, the BSA 102a overlaps with the BSA 102b. In such circumstances, an STA within range of either AP, e.g., AP 104a or AP 104b, can select which AP to receive service from. The STA 106e is shown in the overlap region 110 and is receiving service from the AP 104b.

In some implementations, the wireless communication system 100 may not have centralized APs 104a and 104b, but rather may function as a peer-to-peer network between the STAs. Accordingly, the functions of access points described herein may alternatively be performed by one or more of the STAs.

FIG. 1 further includes a multicast message input to the STA 106a. The multicast message input is part of a multicast message flow including the STA 106a, the STA 106c, and the STA 106d. The input is transmitted from the STA 106a to the AP 104a and subsequently distributed to the STA 106c and the STA 106d. In the system 100 shown in FIG. 1, the AP 104a and the AP 104b can independently transmit the multicast message input to the STA 106c and the STA 106d. In some implementations, the message is also multicast back to the STA 106a. While the APs may be configured to independently transmit the multicast message, coordinating the transmission of these multicast messages has been found to produce several non-limiting advantages.

One non-limiting advantage of coordinated transmission of group messages such as the multicast message input shown in FIG. 1 is to reduce the transmission medium used for multicasting. As each AP is synchronously sending the multicast message, to ensure delivery of the message at nearly the same time, the APs must each be prepared for transmission. This includes, for example, reserving the transmission medium until the each AP is ready to transmit. If one AP is prepared sooner than another, it must wait an undetermined period of time, reserving the medium all along, for its counterpart(s). This time could be used for other transmissions rather than being held idle in anticipation of a transmission.

Another non-limiting advantage of coordinated transmission of group messages is extension of range. Synchronized transmission of the same signal from two sources can extend the range of the signal as compared to transmitting the same signal at two different points in time. Furthermore, the identity of the content of the signal can further enhance the range as compared to simultaneous transmission of two different signals. Extending the range of a signal can provide more reliable message communication over longer distances. The increased reliability results in fewer dropped and/or corrupt packets. This may also lead to a reduction in subsequent retry messaging that may be performed to obtain or otherwise correct the missing packets.

It should be noted that the group message shown in FIG. 1 is a multicast message from the STA 106a. In some implementations, the multicast input message may be received/generated by an AP. Furthermore, while multicast messages are shown in FIG. 1, the features are broadly applicable to group messaging, including multicast messages and common broadcast messages.

Figure 2:
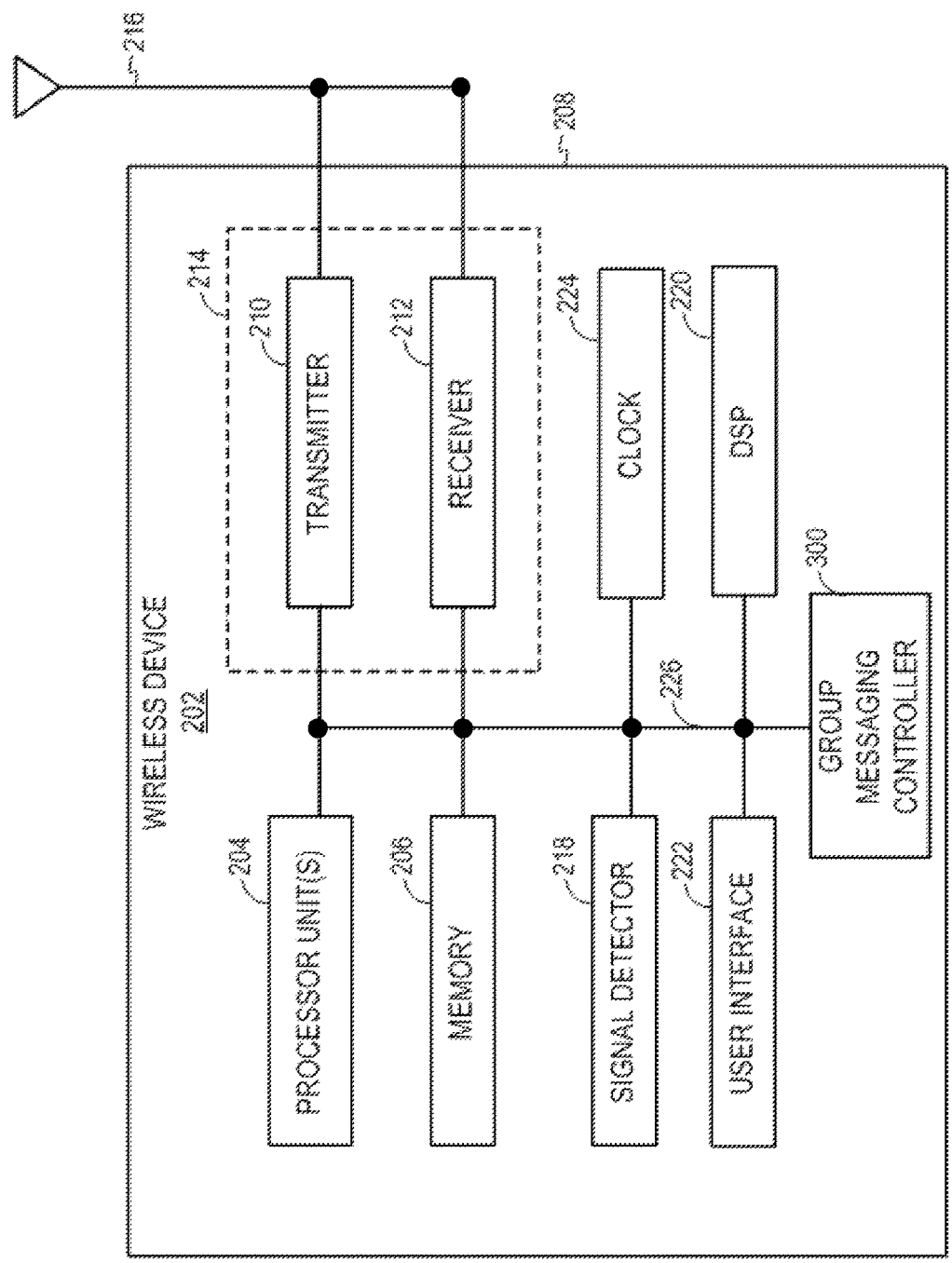
FIG. 2 illustrates various components that may be utilized in a wireless device that may be employed within a wireless communication system.

FIG. 2 illustrates various components that may be utilized in a wireless device 202 that may be employed within the wireless communication system 100. The wireless device 202 is an example of a device that may be configured to implement the various methods described herein. In one implementation, the wireless device 202 may be an access point such as the AP 104a or the AP 104b. The wireless device 202 may receive configuration parameters to adjust the functionality of one or more elements to achieve the desired access point features. In one implementation, the wireless device 202 may be a user equipment such as one of the STAs shown in FIG. 1. In such implementations, the wireless device 202 may receive configuration parameters to adjust the functionality of one or more elements to achieve the desired features for the user equipment. It will be appreciated that an embodiment of the wireless device 202 may selectively perform access point and user equipment features.

The wireless device 202 may include a processor 204 which controls operation of the wireless device 202. The processor 204 may also be referred to as a central processing unit (CPU). The wireless device 202 may also include a memory 206, which may include both read-only memory (ROM) and random access memory (RAM), may provide instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described herein. In addition, the wireless device 202 may include a clock 224 configured to generate a clock signal to coordinate and synchronize activities of the wireless device 202. In some configurations, the processor 204 may include the clock 224. The processor 204 may be configured to update the clock 224 with a time value to allow for synchronization with other wireless devices.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222. The user interface 222 may comprise a keypad, a microphone, a speaker, and/or a display. The user interface 222 may include any element or component that conveys information to a user of the wireless device 202 and/or receives input from the user.

FIG. 2 also includes a group messaging controller 300. The group messaging controller 300 may be configured to coordinate group messaging for the wireless device 202. The group messaging controller 300 is described in further detail with reference, for example, to FIG. 3 below.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may also implement the functionality described above with respect to the signal detector 218 and/or the DSP 220. Further, each of the components illustrated in FIG. 2 may be implemented using a plurality of separate elements.

Figure 3:
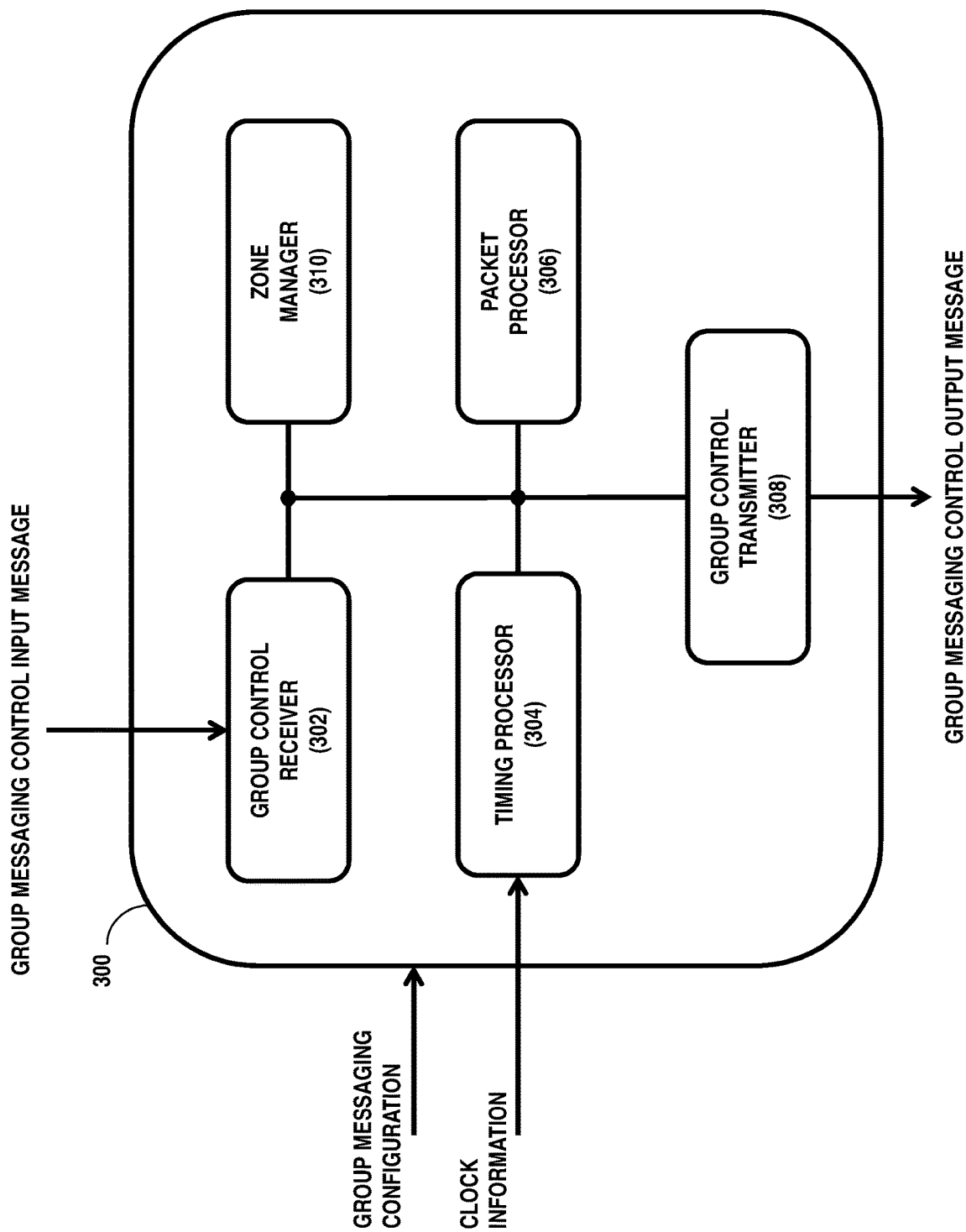
FIG. 3 shows a functional block diagram of a group messaging controller.

FIG. 3 shows a functional block diagram of a group messaging controller. The group messaging controller 300 may be configured to implement, in whole or in part, one or more of the methods described herein.

The group messaging controller 300 may include a group control receiver 302. The group control receiver 302 may be configured to receive a group messaging control input message. The group messaging control input message may be a message generated by the wireless device 202 in which the group messaging controller 300 is included. For example, the transmitter 210 or the processor 204 may request the next coordinated group messaging time as part of scheduling transmission of a message. The group messaging control input message may be received from device in data communication with the wireless device 202 in which the group messaging controller 300 is included. Such input messages may include negotiation messages with other APs to determine which AP is the master node, common time information, timing synchronization information, repetition count, transmission rate, transmission channel, and the like. The input messages may be stored in the memory 206 or provided directly to one or more of the elements shown in FIG. 3.

The group messaging controller 300 may include a timing processor 304. The timing processor 304 may be configured to coordinate the timing of group messages. The coordination may be based on previously received group control input messages (e.g., identifying the common transmit time). The timing processor 304 may also be configured to determine the next group transmission time. The coordination and determination performed by the timing processor 304 may be based in part on clock information (e.g., current time) obtained from the clock 224.

The group messaging controller 300 may include a packet processor 306. The packet processor 306 is configured to coordinate the packet details for coordinated group transmissions. As discussed above, the synchronization includes aligning the packets to be transmitted such that the content, headers, format, etc. are the same across APs. The packet processor 306 may be configured to generate the packets based on the previously obtained group messaging control information. In some implementations, the packet processor 306 may provide a group control output message which can be used by the wireless device 202 to generate one or more packets for transmission. The packet processor 306 may dynamically configure one or more elements of the wireless device 202 to coordinate the functions with other one or more wireless device(s).

The information generated by the packet processor 306 and/or the timing processor 304 may be included in a group messaging control output message. The group messaging controller 300 may include a group control transmitter 308 configured to transmit the group messaging control output message. The group control transmitter 308 may provide the group messaging control output message to another element of the same wireless device in which the group messaging controller 300 is included. In some implementations, the group control transmitter 308 may cause the output message to be transmitted to an AP or a STA associated with the wireless device.

The group messaging controller 300 may further include a zone manager 310. The zone manager 310 may be configured to maintain information related to APs included in a zone such as zone identity information. In some implementations, the zone manager 310 may be referred to as a zone identity manager. A zone generally refers to a group of APs having common group parameters. The common group parameters may include a group temporal key, a packet sequence number, or media access control header information including a transmitter address. In some implementations, the zone manager 310 is configured to process received group messaging input messages which include zone information. The processing may include parsing the message, identifying data fields included in the message, and storing the information included in the message such that the group messaging controller 300 and, more generally, the wireless device 202 may include the parameters in operational decisions. In some implementations, the group temporal key may be transmitted to the recipient via a unicast frame after the recipient obtains a unicast traffic key. In such implementations, the group temporal key may be decrypted by the unicast traffic key.

In some implementations, the zone manager 310 may be configured for negotiating operational parameters for synchronized messaging with a central node (e.g., zone management node) and/or other APs. For example, the zone manager 310 may be configured to process a group messaging input including a zone negotiation request. A zone negotiation request may be used to negotiate one or more common parameter across APs in the zone. The zone manager 310 may be configured to generate a response message to the zone negotiation request. In some implementations, the response may include a zone negotiation confirmation message. For example, the zone manager 310 may determine whether a non-acknowledgment message was received for a specific packet sequence identifier. In some implementations, the zone manager 310 may negotiate with other APs to determine which AP will serve as the master coordinator. In some implementations, the zone manager 310 may communicate with a central node to provide information regarding and receive zone information.

The group messaging controller 300 may receive a group messaging configuration. In some implementations, the coordination details (e.g., common time, packet format, etc.) may be received by the wireless device 202 and stored in the memory 206. In such implementations, the configuration information may be obtained by the group messaging controller 300 and used by the elements included in the group messaging controller 300.

Figure 4:
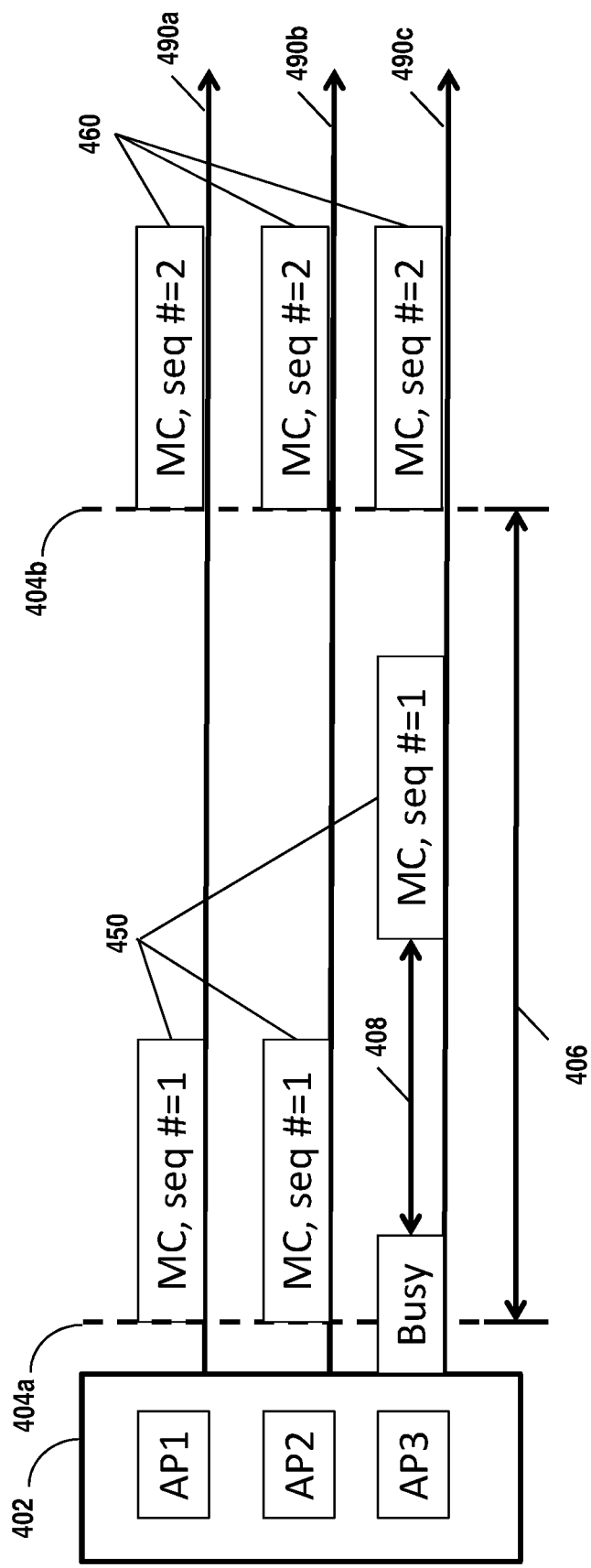
FIG. 4 shows a message timeline diagram for an exemplary multicast messaging system.

FIG. 4 shows a message timeline diagram for an exemplary multicast messaging system. The system 402 includes three APs (e.g., AP1, AP2, and AP3). The APs shown are each associated with a timeline (490a, 490b, and 490c) illustrating AP transmission activity along a time continuum. It will be appreciated that the timelines shown are a snapshot of a period of time and the timelines may continue.

Each AP may be configured to attempt transmission of a first multicast frame 450. The first multicast frame 450 shown is the same multicast (MC) frame and each AP included in the system is configured to simultaneously transmit the first multicast frame. The APs coordinate the packet sequence for a common transmission time 404a followed by a multicast period 406. When the common transmission time 404a is reached, each AP may be configured to transmit the multicast frame 450 with the corresponding sequence number if medium is clear during the multicast period 406. As shown in FIGS. 4, AP1 and AP2 achieve this. If the medium for a given AP is not clear, such as shown for AP3 in FIG. 4, the unclear AP may be configured to contend to transmit this packet after a predetermined duration 408 at a later time to prevent collision. At a second occurrence of the common transmit time 404b, each AP is able to transmit a second multicast frame 460 simultaneously.

FIG. 4 provides a high level view of simultaneous group messaging. As noted above, the coordination includes determining the common transmission time along with coordination of the transmission. Turning first to the coordination of the common transmission time, APs configured for synchronized group transmissions may first determine a common transmission time for each packet/frame sequence number. An example of how the AP can determine the time is through the use of a common transmission time. This common transmission time may be predetermined (e.g., configuration) or provided through backhaul or over-the-air signaling.

In some implementations, the common transmission time can be periodic. The sequence number included in the transmitted frames may be incremented as each transmission time occurs. Accordingly, based on the current time and the common transmission time, an AP may calculate the sequence number for a transmission. In some implementations, the sequence number may be dynamically decided per transmission time based on other information. For example, APs may determine a previous packet sequence number was not received by most intended receivers. In such an implementation, APs may decide to retransmit the same sequence number at the next transmission time.

It may be desirable, in some implementations, to include a non-periodic common transmission time. In such implementations, the APs negotiate each common transmission time and corresponding sequence number. For example, the APs included in the group may exchange messages to identify a master AP that will be responsible for coordinating the common transmitting. Each non-master AP provides information to the master AP such as load, multicast streams, channel information, etc. Based on this information, the master AP determines the next common transmission time and, in some implementations, the next sequence number. The common transmission time may be transmitted to the non-master APs using a trigger frame, backhaul messages, or similar communications. The group APs then have the information needed to identify the next common time and, in some implementations, the sequence number to use for the transmitted packet.

The system may concurrently include multiple group messaging (e.g., multicast) streams. Streams may be shared by APs in the network. In view of the multiple different streams, it is desirable in some implementations, to stagger common transmission times among different streams. The staggering may be achieved by configuring the AP to introduce short interframe spaces (SIFSs) between streams to hold the group messaging medium for next group messaging stream. APs may be configured to aggregate packets associated with different streams in a single packet if they are sent by the same set of APs.

FIG. 5A shows a message timeline diagram for an exemplary multicast messaging system in which aggregation may occur. The system 402 includes three APs (e.g., AP1, AP2, and AP3). The APs shown are each associated with a timeline (490a, 490b, and 490c) illustrating AP transmission activity along a time continuum. FIG. 5A shows a single common transmission period that begins as the common transmission time 404a. Because all three APs included in the system are transmitting packets for stream 1 and stream 2, these packets may be aggregated.

FIG. 5B shows a message timeline diagram for an exemplary multicast messaging system in which aggregation has occurred. The timeline diagram shown in FIG. 5B illustrates the aggregation of the packets for stream 1 and stream 2 shown in FIG. 5A.

Having described how the common time is coordinated, what follows is a description of how the transmissions may be coordinated for the agreed upon time. In one implementation, the APs included in the group are configured to transmit at the common time if channel is clear. If the channel is not clear, the AP may be configured to begin contending to transmit after the common transmit time at a point in time after the transmission of the multicast packet. By waiting until after the multicast packet transmission duration, the "late" AP avoids collision with other group messaging APs' synchronized transmissions.

In some implementations, the AP may be configured to start a clear channel assessment (CCA) sensing prior to the common transmission time. The sensing may be configured to start at a predetermined number of seconds/milliseconds from the common transmission time. The predetermined quantity may be included in the group messaging configuration. When the AP senses the channel is clean, the AP may be configured to reserve the opportunity to transmit. For example, the AP may transmit a clear to send to self ("CTS2self" or "CTS-to-self") message to reserve the medium until the group messaging packet is transmitted. If medium is reserved successfully, the AP may transmit the group messaging packet at the common transmission time. If the reservation is not obtained, the AP may be configured to start contending for the opportunity to transmit after the multicast packet transmit duration. In some implementations, if the reservation is not obtained, the AP may be configured to drop out of (e.g., disassociate from) the multicast group.

Triggering is another way the transmission may be coordinated. Triggering may be included to provide non-periodic synchronized transmission.

Figure 6:
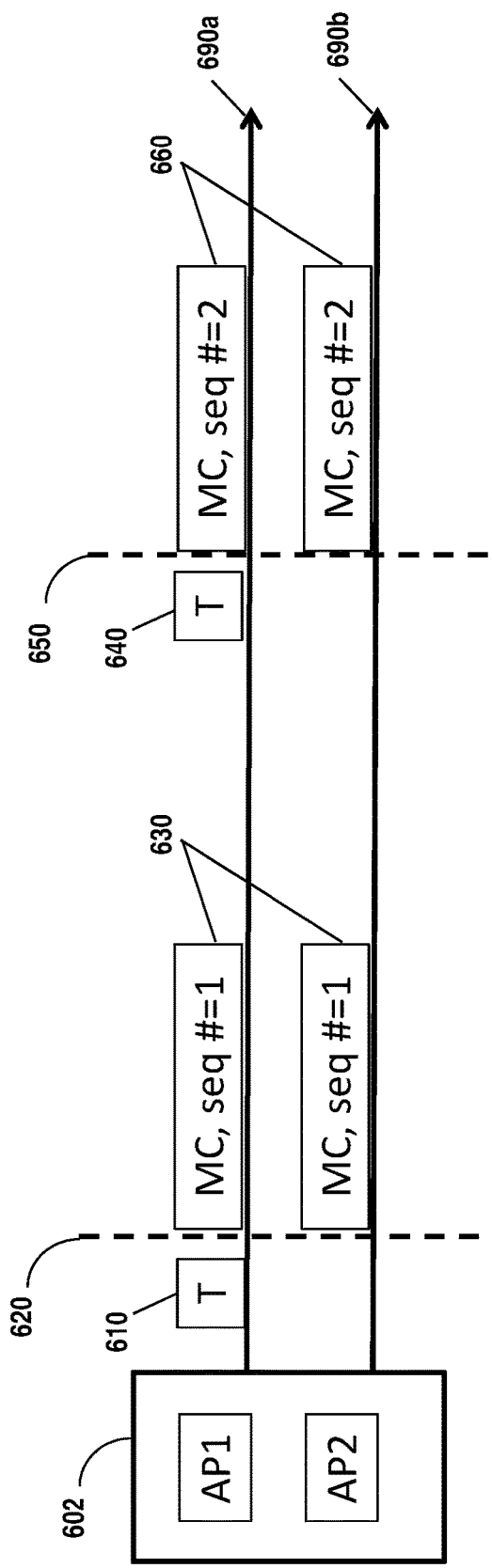
FIG. 6 shows a message timeline diagram for an exemplary multicast messaging system coordinated via triggering.

FIG. 6 shows a message timeline diagram for an exemplary multicast messaging system coordinated via triggering. The system 602 includes two APs (e.g., AP1 and AP2). The APs shown are each associated with a timeline (690a and 690b) illustrating AP transmission activity along a time continuum.

In FIG. 6, AP1 is the master AP. AP1 may be designated as the master AP through negotiation with the other APs in the group. AP1 may be designated as the master AP by a control node (not shown) in communication with each AP in the group. AP1 may be configured to determine the next common transmission time such as described above. AP1 may be configured to transmit a first trigger frame 610 identifying a first common transmission time 620. In some implementations, the first trigger frame 610 may include only information identifying the first trigger frame 610 as a synchronization trigger frame. Receiving APs, by convention and configuration, may be configured to wait a predetermined period of time before transmitting. In some implementations, the first trigger frame 610 may include the common transmit time. The common transmit time may be expressed in absolute or relative terms. In some implementations, the trigger frame may include a sequence number for the next group message frame.

Upon arrival of the common transmission time 620, the APs are configured to transmit a first group packet 630. Subsequently, the AP1 may transmit a second trigger frame 640 indicating a second common transmission time 650 during which a second group packet 660 may be transmitted.

During group messaging, it may be desirable to secure the group messages. As described thus far, the packets transmitted by the group messaging APs may be identical. This requires each transmitted message packet is formed by the same inputs, including unencrypted MAC protocol data unit (MPDU) data, group temporal key (GTK), MPDU sequence number, and common MAC header including a common transmit MAC address (TA).

One way to associate APs for coordinated group messaging is through the use of what will be referred to herein as "multicast zones." A multicast zone generally refers to a group of APs sharing the same input to form each synchronized group packet transmission. APs within the same multicast zone may share a common group temporal key and MAC transmit address. As these shared attributes, once assigned, are maintained by the AP for an extended period of time, they can be determined in advance such as by a central node or via inter-transmitter (e.g., inter-AP) negotiation. In some implementations, the multicast zone coordinating central node may be an authentication server, a central controller, or an AP designated as the controller.

Multicast zones may be identified statically or dynamically. In static configurations, a group of APs are configured to be associated with a multicast zone. The configuration may be based on physical location and/or common operator. The static configuration may be included in the group messaging configuration stored in the memory of the wireless device. In dynamic configurations, a group of APs may be identified for inclusion in a zone. The identification may be based at least in part on APs sharing the same group messaging stream. Other characteristics of the AP may be considered when forming a dynamic group such as load, number of connected devices, power profile (e.g., amount remaining, source, etc.), and the like. Whether statically or dynamically configuring the multicast zones, the zone-forming decision may be made by a central node or via inter-AP negotiation.

Each AP included in a multicast zone may be configured to transmit the zone TA and GTK to STAs within the basic service area upon association (e.g., before traffic starts between the AP and STA). Upon receiving a packet with multicast zone TA, STAs determine the packet as being a synchronized group messaging packet from intended zone based on the TA. The STA may further identify the zone GTK based on the TA to decrypt the packet.

One way an AP may be configured to provide the zone TA to associated STAs is through signaling. For example, the AP may include the zone TA in via beacons, association and/or probe responses, unicast frames, or the like.

The AP may also be configured to use signaling to provide the zone GTK. In one implementation, the AP may transmit the zone GTK to associated STAs via unicast frame after STA obtains its unicast traffic key, which can be used to encrypt the later transmitted zone GTK.

Described thus far are systems and methods for coordinating the transmission of group messages such as multicast messages. Coordination may include coordinating the transmission channel on which the multicast messages are transmitted. For example, multicast transmissions for APs having different primary channels may be coordinated using the features described herein.

An access point generally includes one or more channels. A channel refers to a communication bandwidth which the AP is configured to use for sending and receiving messages. One channel may be designated as the "primary channel" The primary channel alone may be used to communicate with a class of devices. The primary channel in combination with a secondary channel may provide enhanced communications with a second class of devices.

Each channel is generally associated with a frequency. In some implementations, the AP may operate over 80 MHz of bandwidth. The 80 MHz may be allocated to different channels of 20 MHz each. Accordingly, in such implementations, the AP may have four channels, one of which is designated as primary.

When transmitting synchronized group messages, it may be desirable to further coordinate the channels which are used for transmitting the synchronized messages. In one implementation, the APs included in the group communication having the same primary channel may simultaneously transmit the same 20 MHz multicast packet on their primary channel.

Figure 7:
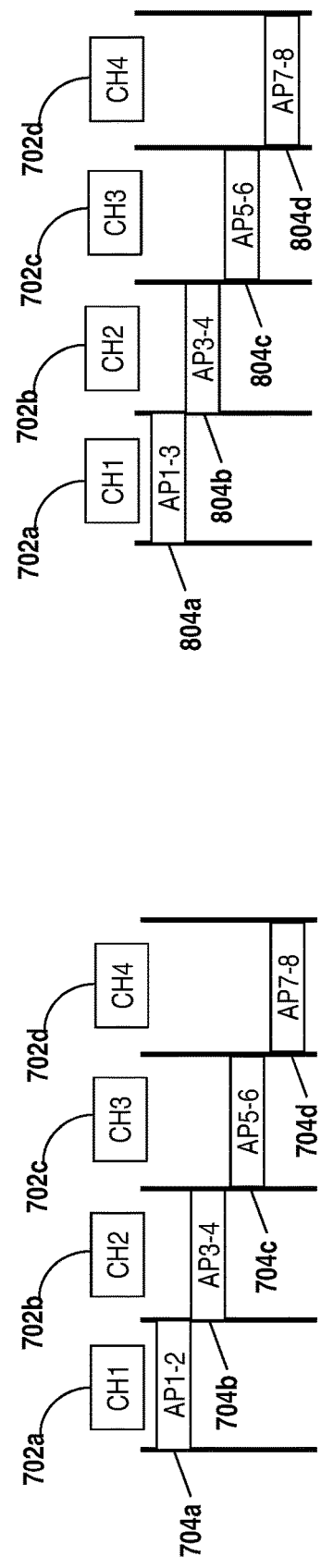
FIG. 7 shows a channel transmission diagram for an example communication system which includes four channels.

FIG. 7 shows a channel transmission diagram for an example communication system which includes four channels. The channels 702*a*, 702*b*, 702*c*, and 702*b* may represent a portion of the bandwidth the AP is configured to use for transmitting and receiving messages. As shown in FIG. 7, APs 1 and 2 are configure to use channel 1 (CH1) 702*a* as the primary channel, APs 3 and 4 are configured to use channel 2 (CH2) 702*b* as the primary channel, APs 5 and 6 are configured to use channel 3 (CH3) 702*c* as the primary channel, and APs 7 and 8 are configured to use channel 4 (CH4) 702*d* as the primary channel. Accordingly, APs 1 and 2 are configured to simultaneously transmit a multicast packet 704*a* on their primary channel, e g, channel 1 (702*a*). The other APs are configured to transmit respective multicast packets (e.g., 704*b*, 704*c*, and 704*d*) only on their respective primary channels in the implementation shown in FIG. 7.

The implementation shown in FIG. 7 can reduce the amount of coordination needed among the APs. As shown, only the APs having the same primary channel may coordinate the synchronized message transmissions. The transmission time for each channel may be the same or may differ per channel. In FIG. 7, each channel is associated with a different multicast transmission time. In such implementations, the AP may be configured to broadcast group messaging transmit time offset information from other group messaging APs. The offset information may be transmitted in beacons and/or probe responses.

The offset information may be used by a STA that did not decode a multicast packet transmitted on the primary channel of a first AP. Based at least in part on the offset, the STA may be configured to switch to another primary channel for another decoding attempt. Furthermore, the STA can begin decoding the multicast packet on the primary channel with the earliest transmission time. If decoding fails, the STA can switch to another channel with a transmit time closest to the current time to attempt decoding. This channel jumping may be repeated for each channel.

Where each AP is configured to transmit on its primary channel, an AP may be configured to opportunistically transmit a multicast packet on one or more different primary channels associated with other APs. The AP may be configured to determine that no traffic is queued for transmission on a given channel. If no traffic is queued, the AP may be configured to send the group packet during multicast period of a different primary channel associated with other APs. In extreme case where no traffic is queued for any AP, the APs may simultaneously transmit on each primary channel to extend range. For example, AP through AP8 may simultaneously transmit a multicast packet on channels 1-4 (702a, 702b, 702c, and 702d) sequentially with full transmit power.

Figure 8:
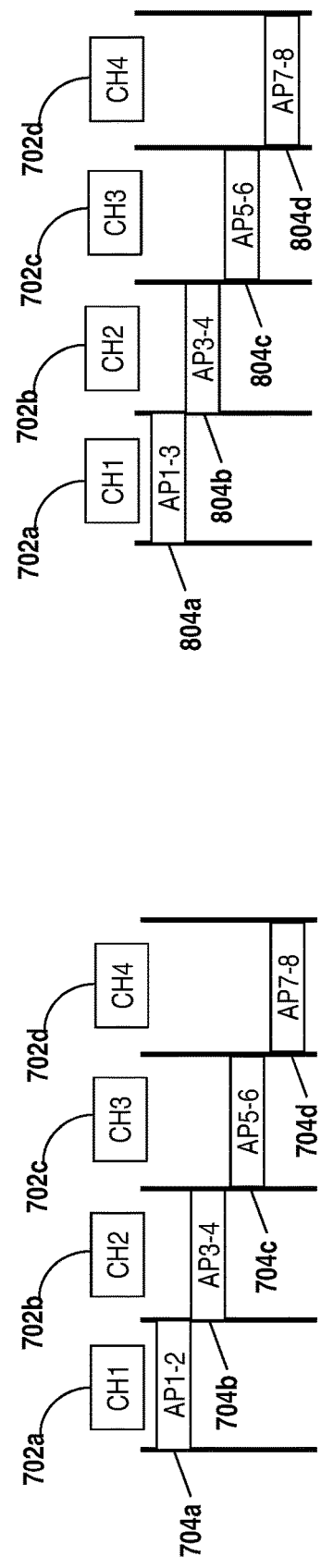
FIG. 8 shows a channel transmission diagram for another example communication system which includes four channels and opportunistic transmission.

FIG. 8 shows a channel transmission diagram for another example communication system which includes four channels and opportunistic transmission. The system includes similar channels (702a, 702b, 702c, and 702d) as shown in FIG. 7. However, in the implementation shown in FIG. 8, AP3 opportunistically transmits a first copy of the group messaging packet 804a on channel one 702a and a second copy of the group messaging packet 804b again on channel two 702b.

Figure 9:
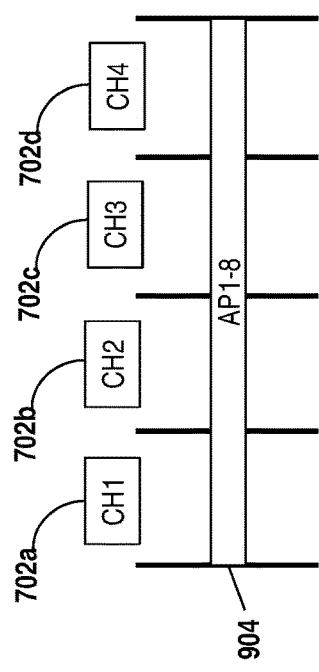
FIG. 9 shows a channel transmission diagram for another example communication system which includes four channels.

FIG. 9 shows a channel transmission diagram for another example communication system which includes four channels. The system includes similar channels (702a, 702b, 702c, and 702d) as shown in FIG. 7. However, in the implementation shown in FIG. 9, each AP is configured to simultaneously transmit a full-bandwidth multicast packet 904 via each channel (e.g., across the whole bandwidth). The full-bandwidth packet can be encoded in different ways. In some implementations, it can be a single encoded packet across the full bandwidth, and each AP will defer packet transmission is sensing any part of the full bandwidth is busy. In some implementations, it can be the same 20 MHz encoded packet repeated on each of 20 MHz channel in the full bandwidth, and each AP will defer transmission only on 20 MHz channels sensed busy.

In communication systems, it may be desirable to allocate medium time for transmission of non-acknowledgment (NACK) messages. A non-acknowledgment message may be transmitted from the STA to an AP indicating a packet which was not received or which the STA was unable to decode. This allows the AP to schedule a retransmission of the non-acknowledged message(s).

The allocation of the NACK messaging time may also be synchronized for group messaging. To reduce medium usage, STAs that not able to decode a group message packet may be configured to send a NACK message simultaneously with the same packet format. In one implementation, the NACK transmission time may be fixed. For example, the STA may be configured to transmit NACK message(s) after a period of time after a corresponding group messaging packet transmit time. The fixed period may be provided to the STA by the AP in a beacon, for example. In some implementation the period of time may be implemented as a short interframe space (SIFS). Accordingly, the STA will transmit NACK messages based on the synchronized transmit time and the fixed period. In some implementations, the synchronized transmit time may be determined based on receipt of a synchronized group message at the STA. In some implementations, the beacon may include the common transmit time along with the fixed NACK offset.

Figure 10:
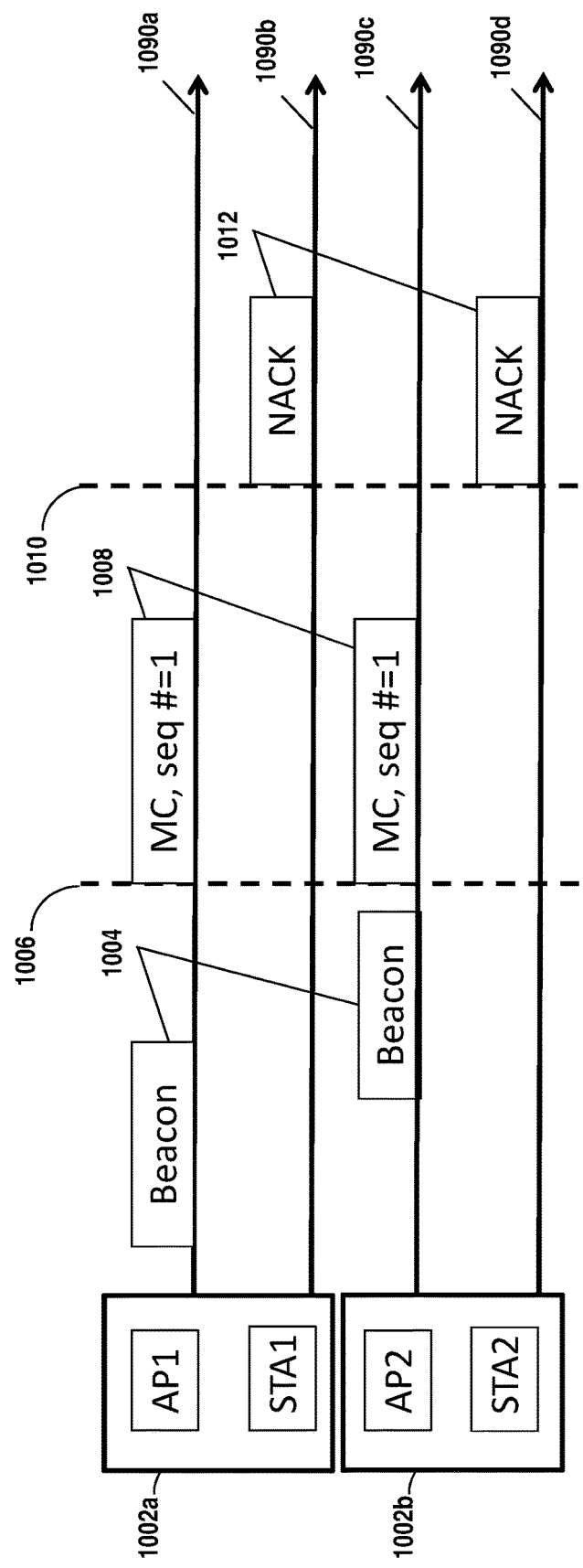
FIG. 10 shows a message timeline diagram for an exemplary multicast messaging system including coordinated non-acknowledgment (NACK) messaging.

FIG. 10 shows a message timeline diagram for an exemplary multicast messaging system including coordinated NACK messaging. The system shown includes two basic service sets, set 1002a including AP1 and STA1 and set 1002b including AP2 and STA2. Each entity (AP1, STA1, AP2, and STA2) is associated with a respective message transmission timeline (1090a, 1090b, 1090c, and 1090d). The message transmission timeline indicate approximately when the indicated message is transmitted by the entity associated with the corresponding timeline.

AP1 and AP2 are shown to transmit a beacon 1004. The beacon 1004 may include one or more of the common multicast transmit time information and a NACK offset. At a common transmit time 1006, a first multicast packet 1008 having a sequence number of 1 is transmitted from both AP1 and AP2. The STA1 and the STA2 is configured to identify a NACK transmit time 1010 based on the NACK offset. The NACK offset may be combined with the common multicast transmit time information to identify the NACK transmit time 1010. In some implementations, the NACK offset may be applied to the start or end of a received multicast packet (e.g., the first multicast packet 1008). Upon arrival of the NACK transmit time 1010, the STA1 and the STA2 transmit respective NACK messages 1012 having the same packet format.

In some implementations, it may be desirable to provide an explicit NACK time for a particular packet sequence number. In such implementations, the NACK transmit time may be provided via a beacon to the STA. In some implementations, this allows the APs to stagger the NACK times for different group messaging streams. The NACK time information may identify a period of time during which the STA can transmit NACK messages.

FIG. 11 shows a message timeline diagram for another exemplary multicast messaging system including coordinated NACK messaging. The system shown is similar to that shown in FIG. 10. The system shown includes two basic service sets, set 1002a including AP1 and STA1 and set 1002b including AP2 and STA2. Each entity (AP1, STA1, AP2, and STA2) is associated with a respective message transmission timeline (1190a, 1190b, 1190c, and 1190d). The message transmission timeline indicates approximately when the indicated message is transmitted by the entity associated with the corresponding timeline.

The AP1 and the AP2 transmit a beacon 1104 to the STAs. Unlike the beacon 1004 in FIG. 10, the beacon 1104 includes a value indicating NACK transmissions will be accepted by the AP based on a trigger message. The STAs are permitted to transmit NACK messages based on the NACK trigger message.

At the common transmit time 1006, the first multicast packet 1008 having a sequence number of 1 is transmitted from both AP1 and AP2. Thereafter, the AP1 and the AP2 transmit a NACK trigger (NT) message 1106. The NT message 1106 may include the NACK transmission time 1010 of information a STA may be configured to use to determine the NACK transmission time 1010 (e.g., offset). In some implementations, the STAs may be configured to determine the NACK transmission time 1010 based on an offset from the beginning or end of the NT message 1106. Upon arrival of the NACK transmit time 1010, the STA1 and the STA2 transmit respective NACK messages 1012 having the same packet format.

As discussed, the group messages may be transmitted from an AP to a STA. To further coordinate the transmission, the rate at which the message is transmitted may be synchronized. In some implementations, the AP may be configured to adapt the group messaging transmission rate based link quality. For example, a common group messaging transmission rate may be determined for the APs included in the group. The determination may be based on the number of STAs (e.g., percentage, total, average, moving average, etc.) which are able to decode transmitted messages. Each AP in the group may be configured to collect link quality information for individual intended STA in its coverage area via feedback from the STAs. The link quality information may include received signal strength indication, supported modulation coding scheme.

The STA information may be provided to a central node. The central node is configured to determine the common group messaging transmission rate based on the STA information across the group APs. The central node may then provide the common rate to the APs. The APs, in turn, may adjust the transmission rate for group transmissions based on the received common rate information.

In some implementations, the AP may be configured to adapt the group messaging transmission rate based on NACK messages. For example, in implementations including synchronized NACK messages, such as described in relation to FIG. 10 or 11, a common group message transmission rate may be adjusted based on the number of APs receiving at least one NACK message. If the number of APs receiving a NACK message exceeds a threshold, the rate may be reduced. A central node may be included to collect the NACK reports and, based on the number of APs reporting NACK messages, identify a rate and transmit the rate information to the group APs. For example, the rate may be increased from a first level to a second level associated with a higher rate than the first level if no APs report receiving a NACK message for a continuous sequence of group message packets.

In implementations which are not configured for synchronized NACK messages, the APs may track the number of NACKs received vis-à-vis the number of intended recipient STAs. Each group AP may be configured to provide a number of intended recipient STAs transmitting a NACK message to a central node. The central node may then determine a rate for the group based on the number of STAs transmitting NACK messages. In some implementations, rate may be adjusted based on a percentage of STAs providing NACK messages over a sequence of packets. For example, the transmission rate may be increased from a first level to a second level associated with a higher rate than the first level if less than a predetermined percent of intended STAs provide NACK messages for a continuous sequence of group messaging packets. Each AP can provide an identifier for STAs indicating NACK messages to a central node. The central node is configured to determine the common rate based on total percent of STAs transmitting NACK messages. The central node may then transmit the common rate information to the group APs. The APs, in turn, may be configured to adjust the group message transmission rate based on the received common rate information.

Each AP may individually adapt the rate using repetition. For example, an AP in the group may repeat a packet for a maximum number of times. The number of repetitions may be indicated in a beacon signal transmitted from the AP to the STA(s). The recipient STAs associated with a given AP may be configured to combine the repeated packets for decoding. As a first repetition may be partially decoded, the second repetition may provide the missing information to fully decode the packet having a specific sequence number. Each AP can individually change its actual transmission rate by adapting its repetition number based on link quality or NACK of STAs receiving multicast packet under its association. In some implementations, the number of repetitions can be increased if NACK is received, and increased if NACK is not received for continuous certain number of multicast packets.

FIG. 12 shows a message timeline diagram for another exemplary multicast messaging system including repetition based rate adaptation. FIG. 12 includes three APs in the group. At a common message transmission time 1202, a first multicast packet 1206a is transmitted. The APs may be configured to repeat up to four times. This repetition may be used to determine a multicast transmission period 1212 during which a multicast packet may be transmitted. The multicast transmission period 1212 includes the common message transmission time 1202 and a period end time 1204.

If an AP is configured with repetition number less than max number, it can be configured to serve its inner STAs in the remaining time. For example, in FIG. 12, AP1 is configured with single repetition and transmits the only multicast packet 1206a, and the AP1 may be configured to use the remaining time in the multicast transmission period 1212 to serve its inner STAs, which are relatively close to the AP1. This may include transmitting other messages to the inner STAs within the AP1's service area. AP1 is shown in FIG. 12 as messaging 1208 to its inner STAs. To reduce interference caused to other STAs, AP1 and its inner STA transmission power can be limited, so that other STAs receiving multicast packets from neighbor APs, e.g. AP2 and AP3, are not affected. The limitation on transmission power can be determined based on measured path loss to other STAs via packet signal strength received from them.

In FIG. 12, as another example, AP3 is configured with number of repetitions as two. Accordingly, AP3 may use the remaining time to message 1210 its inner STAs. As AP2 is configured with number of repetitions as four, AP2 continues transmitting a third multicast packet 1206c and a fourth multicast packet 1206d. Each AP can reconfigure its repetition number in next multicast transmission period based on link quality or NACK of STAs under its association.

Another aspect of group messaging which may be coordinated is retransmission of a packet. An AP may be configured to retransmit one or more packets which are identified as not acknowledged such as via a NACK message received from a STA. The retransmission by the group APs may be determined by a central node. In such implementations, the group APs may be configured to retransmit one or more group message packets based on the number of APs which receive a NACK message. For example if at least a predetermined number of APs report receiving a NACK message, the central node may transmit a message to each AP in the group indicating a synchronized retransmission of the associated packet.

In implementations where the STAs are not configured for synchronized NACK messaging, the APs may be configured to report identification information for the STAs transmitting NACK messages. Each AP in the group may provide this information to a central node. Based on the number of STAs transmitting a NACK, the central node may be configured to schedule retransmission of the packet. For example, if at least a predetermined percentage of intended STAs transmitted a NACK message for one or more packets, the retransmission of the packets may be scheduled. The central node may transmit the retransmission instruction to each AP of the group. The retransmission instruction may include the packet sequence number and/or a retransmission time. Each AP, in turn, may schedule the retransmission of the identified packet either at the next synchronized group message common time or at the time indicated in the retransmission instruction.

Figure 13:
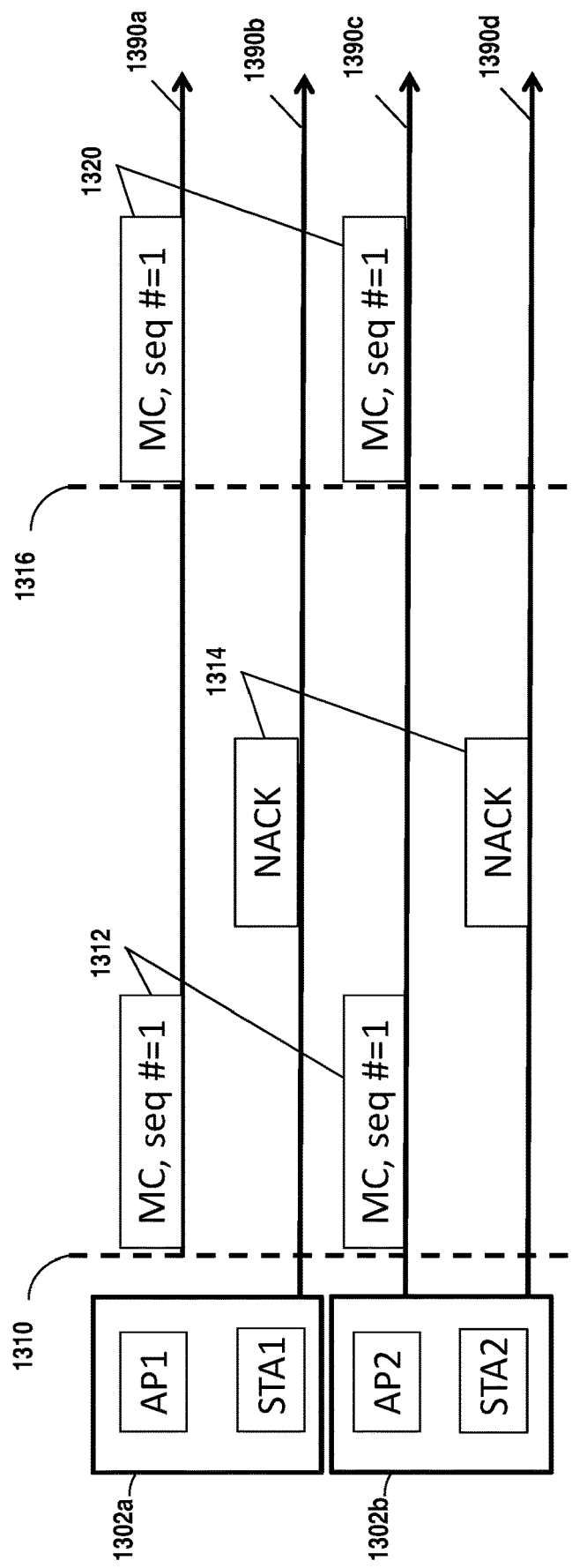
FIG. 13 shows a message timeline diagram for an exemplary multicast messaging system including coordinated retransmission.

FIG. 13 shows a message timeline diagram for another exemplary multicast messaging system including coordinated retransmission. The system shown is similar to the system shown in FIGS. 10 and 11. The system shown in FIG. 13 includes two basic service sets, set 1302a including AP1 and STA1 and set 1302b including AP2 and STA2. Each entity (AP1, STA1, AP2, and STA2) is associated with a respective message transmission timeline (1390a, 1390b, 1390c, and 1390d). The message transmission timeline indicate approximately when the indicated message is transmitted by the entity associated with the corresponding timeline.

At a common group message transmission time 1310, AP1 and AP2 respectively transmit a multicast packet 1312. STA1 and STA2 both fail to decode the packet 1312 and are configured to transmit a NACK message 1314. The NACK message 1314 may be transmitted synchronously or independently as described herein. AP1 and AP2 report the receipt of the NACK message 1314 and, in some implementations, an identifier for the STA transmitting the NACK message 1314. The report may be provided to a central coordination node or to an AP in the group configured to coordinate retransmission for the group. For the example shown in FIG. 13, since all STAs did not successfully process the packet 1312, a retransmission is scheduled. The retransmission may be indicated by providing the packet sequence number to the group APs. Accordingly, at a next common group message transmission time 1316, a packet 1320 is transmitted which represents a retransmission of the multicast packet 1312. In some implementations, the next common group message transmission time 1316 may be included in the retransmission information provided by the central node. In some implementations, the retransmission information may simply indicate that a retransmission of a packet having a specified sequence number is needed. In such implementations, the APs will retransmit the identified packet at the next common transmission time.

It may be desirable, in some implementations, to configure the APs to individually retransmit group messages. In such implementations, an AP is configured to individually retransmit packets outside the synchronized multicast transmission period. Retransmission may be based on receiving NACK messages from at least a predetermined number (or percentage) of intended STAs in association with the AP.

A further aspect which may be coordinated for synchronized group messaging is the medium reservation. In some implementations, an AP may be configured to reserve a transmission medium before sending. For example, an AP may transmit a request to send (RTS) message indicating the AP would like to transmit a message. The AP may be configured to wait until a clear to send (CTS) message is received from one or more STAs associated with the AP. Once the clear to send message is received, the AP may proceed to send the message.

APs may be configured for synchronized RTS messaging. STAs may be configured for synchronized CTS messaging. Multicast APs and STAs can send synchronized RTS/CTS to extend network allocation vector (NAV) setting coverage for group (e.g., multicast) packet protection. If an AP does not receive a CTS message, the AP may be configured to not transmit a synchronized group packet (e.g., "drop out" of the group). This AP may then be configured to individually send the group packet later when RTS/CTS exchange is successful.

Figure 14:
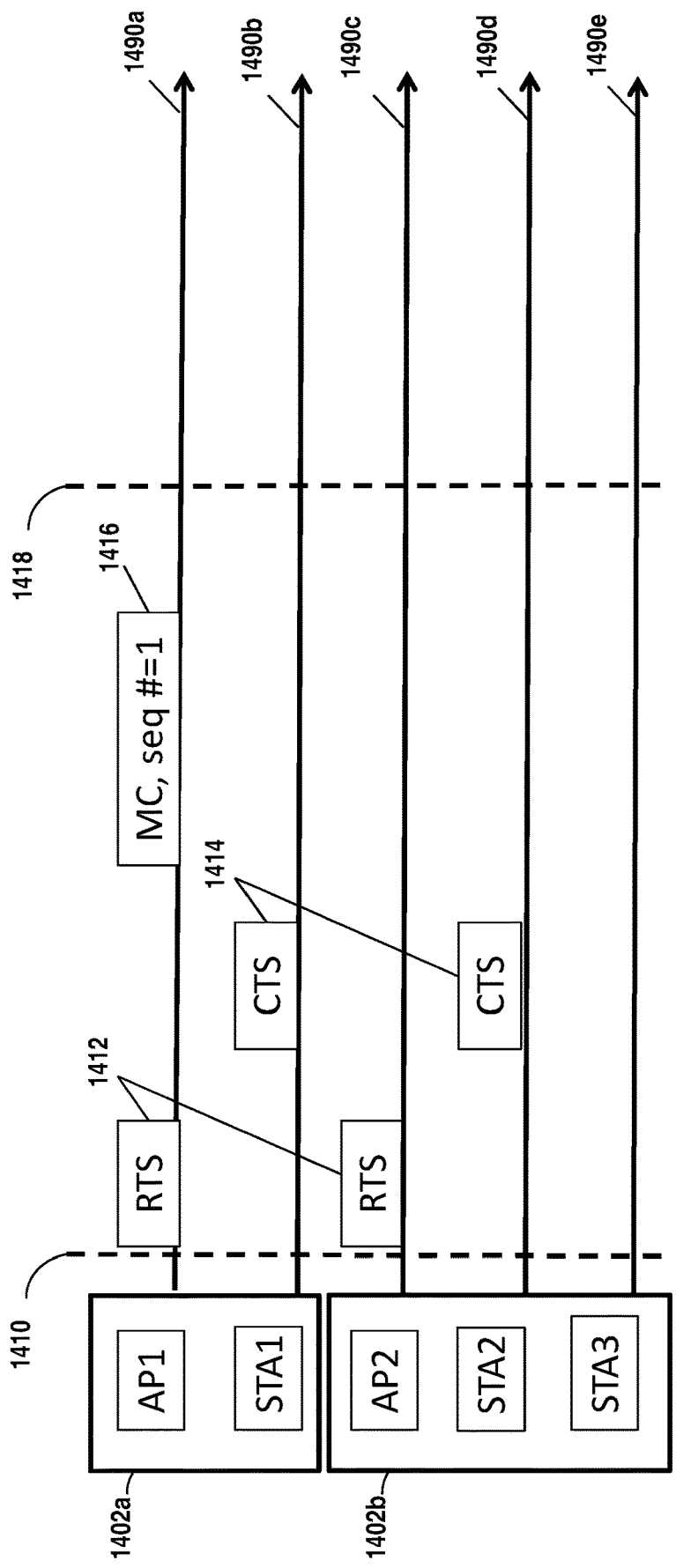
FIG. 14 illustrates a message timeline diagram for an exemplary multicast messaging system including coordinated medium reservation.

FIG. 14 illustrates a message timeline diagram for an exemplary multicast messaging system including coordinated medium reservation. The system shown in FIG. 14 includes two basic service sets, set 1402a including AP1 and STA1 and set 1402b including AP2, STA2, and STA3. Each entity (AP1, STA1, AP2, STA2, and STA3) is associated with a respective message transmission timeline (1490a, 1490b, 1490c, 1490d, and 1490e). The message transmission timeline indicate approximately when the indicated message is transmitted by the entity associated with the corresponding timeline.

At a synchronized group message transmission time, AP1 and AP2 transmit a request to send message 1412. In response, STA1 and STA2 transmit a clear to send message 1414. AP1, having confirmed with all associated STAs that the medium is clear to send, transmits the group message 1416. AP2 however, does no receive the clear to send message 1414 from STA3. AP2 may be configured to transmit a group message when more than half the associated STAs are clear. As shown in FIG. 14, since the condition has not been met, AP2 does not transmit the group message 1416. AP2 may transmit the group message 1416 after an end point 1418 of the common synchronized group message transmission period to STA2 and/or STA3.

FIG. 15 shows a process flow diagram of a method of wireless communication. The method shown in FIG. 15 may be implemented in whole or in part by one or more of the devices described herein such as the wireless device 202 shown in FIG. 2 and/or the group messaging controller 300 shown in FIG. 3. The method may be implemented, for example, in an access point configured for synchronous group messaging.

At node 1502, a transmission time for transmitting a message to a recipient via a first wireless communication transmitter is identified. The message is a message that will be transmitted to at least one other recipient via a second wireless communication transmitter. At node 1504, common group messaging parameters associated with the first and second wireless communication transmitters are identified. The common group messaging parameters include a group temporal key, a common transmission media access control address, and a common group identifier. The common transmit MAC address may be included in a packet MAC header field. The common group identifier indicates the multicast group and may be included in the physical header (e.g., packet preamble) of packets transmitted. Use of the common group identifier ensures packets transmitted for the group messaging session include similar contents. At node 1506, the message is generated based on the common group messaging parameters. The contents of the message to be transmitted to the recipient is the same as contents of the message transmitted to the at least one other recipient. At node 1508, the message is transmitted at the identified transmission time to the recipient.

FIG. 16 shows a process flow diagram of another method of wireless communication. The method shown in FIG. 16 may be implemented in whole or in part by one or more of the devices described herein such as the wireless device 202 shown in FIG. 2 and/or the group messaging controller 300 shown in FIG. 3. The method may be implemented, for example, in a station (e.g., user equipment) configured for synchronous group messaging.

At node 1602, common group messaging parameters are received from a first wireless communication transmitter. The common group messaging parameters are associated with the first wireless communication transmitter and a second wireless communication transmitter. The common group messaging parameters include a group temporal key, a common transmission media access control address, and a common group identifier. Because the common group identifier may be included in a physical header field, a user equipment may use the common group identifier to determine whether the packet is part of a group messaging session associated with the user equipment without having to decode the full packet. At node 1604, a group message is received from the first wireless communication transmitter. At node 1606, the group message is decoded based at least in part on the received common group messaging parameters.

A further innovative method including features for wireless communication describe may be implemented. This implementation illustrates how non-acknowledgment message coordination can be performed. Coordination of non-acknowledgment messaging can further improve the efficiency of group communication. The coordination of non-acknowledgment messaging may be implemented independent of or in conjunction with one or more of the innovative aspects described above to provide a desired level of coordinated communication.

The method may be performed by an access point configured to transmit group messages. The method includes identifying a transmission time for transmitting a message to a recipient via a first wireless communication transmitter. The content of the message is to be transmitted to at least one other recipient via a second wireless communication transmitter. The method also includes generating the message. The contents message to be transmitted to the recipient and to the at least one other recipient each include a header, a message identifier, a message stream identifier, and a payload. The header, the message identifier, the message stream identifier and the payload is the same for the message for each of the recipient and the at least one other recipient. The method further includes transmitting the message at the identified transmission time to the recipient. The method also includes transmitting non-acknowledgment transmission period information indicating a time period for receiving non-acknowledgment messages. Upon receipt of a non-acknowledgment message during the indicated time period, the method includes retransmitting the message.

In another innovative aspect, a further method of wireless communication is provided. This implementation illustrates how transmission alignment may be achieved for transmitters within a group. Agreeing to transmit at a coordinated time may not necessarily result in each agreeing party being able to transmit at the appointed time. The coordination of transmission may be implemented independent of or in conjunction with one or more of the innovative aspects described above to provide a desired level of coordinated communication and/or based on the capabilities of the transmitter.

The method generally allows a transmitter to ensure the transmission medium will be available to meet the agreed coordinated group transmission time. The method includes identifying a transmission time for transmitting a message to a recipient via a first wireless communication transmitter in a transmission group. The contents of the message are to be transmitted to at least one other recipient via a second wireless communication transmitter included in the transmission group. The method also includes generating the message. The contents of the message to be transmitted to the recipient and to the at least one other recipient each include a header, a message identifier, a message stream identifier, and a payload. The header, the message identifier, the message stream identifier and the payload is the same for the message for each of the recipient and the at least one other recipient. The method further includes sensing a transmission medium based on the identified transmission time. The method also includes upon sensing the transmission medium as clear, transmitting the message at the identified transmission time to the recipient. Upon sensing the transmission medium as busy, the method includes disassociating from the transmission group and transmitting the message after the identified transmission time to the recipient. In some implementations of the method, transmitting the message at the identified transmission time includes reservation of the transmission medium for transmitting at the identified transmission time.

Additional coordination may be achieved through yet another innovative implementation of the features described. In such an implementation, access point transmission options (e.g., channel) may be utilized to support redundant transmission of a multicast stream. The coordination of transmission resources may be implemented independent of or in conjunction with one or more of the innovative aspects described above to provide a desired level of coordinated communication and/or based on the capabilities of the transmitter.

The method includes identifying a transmission time and a transmission channel for transmitting a message to a recipient via a first wireless communication transmitter. The content of the message is to be transmitted via a second wireless communication transmitter at the transmission time on the transmission channel and via a third wireless communication transmitter at a point in time after the transmission time on another transmission channel. The method also includes generating the message, wherein the message to be transmitted to the recipient and to the at least one other recipient each include a header, a message identifier, a message stream identifier, and a payload. The header, the message identifier, the message stream identifier and the payload is the same for the message for each of the recipient and the at least one other recipient. The method also includes transmitting the message at the identified transmission time over the transmission channel via the first wireless communication transmitter and via the second wireless communication transmitter. The method also includes at the point in time after the transmission time, transmitting the message over the other transmission channel via the third wireless communication transmitter.

The terms "processor" and "processor module," as used herein are a broad terms, and are to be given their ordinary and customary meaning to a person of ordinary skill in the art (and are not to be limited to a special or customized meaning), and refer without limitation to a computer system, state machine, processor, or the like designed to perform arithmetic or logic operations using logic circuitry that responds to and processes the basic instructions that drive a computer. In some embodiments, the terms can include ROM and/or RAM associated therewith.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "message" encompasses a wide variety of formats for transmitting information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

One having ordinary skill in the art may understand that information and signals may be represented using any of a variety of different technologies and techniques. For example, data, instructions, commands, information, signals, messages, bits, symbols, and chips that may be referenced throughout the above description may be represented by voltages, currents, electromagnetic waves, magnetic fields or particles, optical fields or particles, or any combination thereof.

One having ordinary skill in the art may further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions may not be interpreted as causing a departure from the scope of the present disclosure.

The various illustrative logical blocks, modules, and circuits described in connection with the aspects disclosed herein and in connection with the figures may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above may also be included within the scope of computer-readable media. Additionally, the operations of a method or algorithm may reside as one or any combination or set of codes and instructions on a machine readable medium and computer-readable medium, which may be incorporated into a computer program product.

Any specific order or hierarchy of steps in any disclosed process is an example of a sample approach. Based upon design preferences, the specific order or hierarchy of steps in the processes may be rearranged while remaining within the scope of the present disclosure. The accompanying method claims present elements of the various steps in a sample order, and are not limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles, and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Similarly, while operations are depicted in the figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims may be performed in a different order and still achieve desirable results.

What is claimed is:

1. A method for synchronizing wireless communications, comprising:
   receiving access point information, the access point information including one or more of:
      a load on at least one second access point, wireless channel information, or an identification of multicast streams to be used for synchronized wireless communications;
   determining, by a first access point, a common transmission time for synchronous wireless communications by a group of access points based on the access point information, the group of access points including the first access point and the least one second access point;
   transmitting, by the first access point, a trigger frame to the group of access points prior to the common transmission time, the trigger frame indicating the common transmission time; and
   transmitting, by the first access point, based on the common transmission time, a first wireless communication to at least one first wireless communication device synchronously with at least one second wireless communication from the at least one second access point to at least one second wireless communication device.

2. The method of claim 1, further comprising exchanging one or more frames with the at least one second access point to establish the first access point as a master access point.

3. The method of claim 1, wherein the at least one second wireless communication is associated with at least one first multicast stream, the method further comprising determining a second common transmission time for a second set of synchronous wireless communications associated with at least one second multicast stream different than the at least one first multicast stream, the second common transmission time being staggered relative to the common transmission time.

4. The method of claim 1, wherein the common transmission time is one of a series of common transmission times for the group of access points, the method further including adapting a rate of the common transmission times for the group of access points based on an indication of link quality.

5. The method of claim 1, wherein the synchronous wireless communications comprise a first set of simultaneous wireless communications, the first set of simultaneous wireless communications including the first wireless communication and the at least one second wireless communication.

6. The method of claim 1, wherein each of the first wireless communication and the at least one second wireless communication includes a multicast packet including identical content.

7. The method of claim 1, further including:
   performing a clear channel assessment sensing prior to the common transmission time; and
   in response to determining that a wireless communication channel is clear based on the clear channel sensing, transmitting a message to reserve the wireless communication channel for the synchronous wireless communications including the first wireless communication.

8. The method of claim 1, wherein:
   the group of access points is associated with a group temporal key (GTK), and wherein each of the first wireless communication and the at least one second wireless communication is encrypted based on the GTK,
   a common transmit Media Access Control (MAC) address, and wherein each of the first wireless communication and the at least one second wireless communication includes the common transmit MAC address, or
   a common MAC protocol data unit (MPDU) sequence number, and wherein each of the first wireless communication and the at least one second wireless communication includes the common MPDU sequence number.

9. A method for synchronizing wireless communications, comprising:
   determining, by a first access point, a common transmission time for synchronous wireless communications by a group of access points, the group of access points including the first access point and at least one second access point;
   transmitting, by the first access point, a trigger frame to the group of access points prior to the common transmission time, the trigger frame indicating the common transmission time; and
   transmitting, by the first access point, based on the common transmission time, a first wireless communication to at least one first wireless communication device synchronously with at least one second wireless communication from the at least one second access point to at least one second wireless communication device; and
   transmitting group messaging transmit time offset information,
   wherein:
      the group of access points is a first group of access points;
      the synchronous wireless communications including the trigger frame and the first wireless communication are transmitted on a first primary wireless channel of the first group of access points; and
      the group messaging transmit time offset information identifies at least one second common transmission time associated with at least one second group of access points operating on at least one second primary wireless channel different than the first primary wireless channel.

10. An access point, comprising:
    at least one processor; and
    at least one memory communicatively coupled with the at least one processor and storing processor-readable code that, when executed by the at least one processor, causes the access point to:
       receive access point information, the access point information including one or more of a load on at least one second access point, wireless channel information, or an identification of multicast streams to be used for synchronized wireless communications;
       determine a common transmission time for synchronous wireless communications by a group of access points based on the access point information, the group of access points including the access point and the at least one second access point;

transmit a trigger frame to the group of access points prior to the common transmission time, the trigger frame indicating the common transmission time; and transmit, based on the common transmission time, a first wireless communication to at least one first wireless communication device synchronously with at least one second wireless communication from the at least one second access point to at least one second wireless communication device.

11. The access point of claim 10, further including:

performing a clear channel assessment sensing prior to the common transmission time; and in response to determining that a wireless communication channel is clear based on the clear channel sensing, transmitting a message to reserve the wireless communication channel for the synchronous wireless communications including the first wireless communication.

12. The access point of claim 10, wherein:

the group of access points is associated with a group temporal key (GTK), and wherein each of the first wireless communication and the at least one second wireless communication is encrypted based on the GTK, a common transmit Media Access Control (MAC) address, and wherein each of the first wireless communication and the at least one second wireless communication includes the common transmit MAC address, or a common MAC protocol data unit (MPDU) sequence number, and wherein each of the first wireless communication and the at least one second wireless communication includes the common MPDU sequence number.

13. The access point of claim 10, wherein the at least one second wireless communication is associated with at least one first multicast stream, wherein execution of the code further causes the access point to determine a second common transmission time for a second set of synchronous wireless communications associated with at least one second multicast stream different than the at least one first multicast stream, the second common transmission time being staggered relative to the common transmission time.

14. The access point of claim 10, wherein the common transmission time is one of a series of common transmission times for the group of access points, and wherein execution of the code further causes the access point to adapt a rate of the common transmission times for the group of access points based on an indication of link quality.

15. An access point, comprising:

at least one processor; and at least one memory communicatively coupled with the at least one processor and storing processor-readable code that, when executed by the at least one processor, causes the access point to:

determine a common transmission time for synchronous wireless communications by a group of access points, the group of access points including the access point and at least one second access point;

transmit a trigger frame to the group of access points prior to the common transmission time, the trigger frame indicating the common transmission time; and transmit, based on the common transmission time, a first wireless communication to at least one first wireless communication device synchronously with at least one second wireless communication from the at least one second access point to at least one second wireless communication device, wherein:

the group of access points is a first group of access points; and the synchronous wireless communications including the trigger frame and the first wireless communication are transmitted on a first primary wireless channel of the first group of access points; and transmit group messaging transmit time offset information, the group messaging transmit time offset information identifying at least one second common transmission time associated with at least one second group of access points operating on at least one second primary wireless channel different than the first primary wireless channel.

16. The access point of claim 15, wherein execution of the code further causes the access point to exchange one or more frames with the at least one second access point to establish the access point as a master access point.

17. The access point of claim 15, wherein:

the group of access points is associated with a group temporal key (GTK), and wherein each of the first wireless communication and the at least one second wireless communication is encrypted based on the GTK, a common transmit Media Access Control (MAC) address, and wherein each of the first wireless communication and the at least one second wireless communication includes the common transmit MAC address, or a common MAC protocol data unit (MPDU) sequence number, and wherein each of the first wireless communication and the at least one second wireless communication includes the common MPDU sequence number.

18. The access point of claim 15, wherein the at least one second wireless communication is associated with at least one first multicast stream, wherein execution of the code further causes the access point to determine a second common transmission time for a second set of synchronous wireless communications associated with at least one second multicast stream different than the at least one first multicast stream, the second common transmission time being staggered relative to the common transmission time.

19. The access point of claim 15, wherein the common transmission time is one of a series of common transmission times for the group of access points, and wherein execution of the code further causes the access point to adapt a rate of the common transmission times for the group of access points based on an indication of link quality.

* * * * *